United States Patent
Ehrlich (10) Patent No.: US 7,174,421 B2
(45) Date of Patent: Feb. 6, 2007

(54) HDD WITH RAPID AVAILABILITY OF CRITICAL DATA AFTER CRITICAL EVENT

(75) Inventor: Richard M. Ehrlich, Saratoga, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 466 days.

(21) Appl. No.: 10/727,721

(22) Filed: Dec. 4, 2003

(65) Prior Publication Data

US 2005/0125601 A1    Jun. 9, 2005

(51) Int. Cl.
*G06F 9/445* (2006.01)

(52) U.S. Cl. .................. 711/112; 711/111; 711/103; 713/2

(58) Field of Classification Search ............... None
See application file for complete search history.

(56) References Cited

U.S. PATENT DOCUMENTS

| | | | | |
|---|---|---|---|---|
| 5,860,083 A * | 1/1999 | Sukegawa | .................... | 711/103 |
| 6,336,161 B1 * | 1/2002 | Watts | ......................... | 711/103 |
| 6,789,132 B2 * | 9/2004 | Hoskins | ........................ | 710/5 |
| 6,968,358 B2 * | 11/2005 | Freimuth et al. | ........... | 709/203 |
| 2004/0034765 A1 * | 2/2004 | James | ............................ | 713/1 |
| 2004/0122829 A1 * | 6/2004 | Sakurai et al. | ............. | 707/100 |

* cited by examiner

*Primary Examiner*—B. James Peikari
(74) *Attorney, Agent, or Firm*—Fliesler Meyer LLP (57) ABSTRACT

A hard drive retrieves critical data determined to be requested by a host device in the near future and stores it in cache. The hard drive provides the critical data to the requesting host upon receiving the request, thereby eliminating the time required to respond to the request due to media accessing. The critical data is retrieved upon the occurrence of a critical event. The critical data may be related to power-on of the computer, such as boot sector FAT system data. Thus, the cache of the present invention may use old data rather than new data or the last data accessed.

9 Claims, 4 Drawing Sheets

HDD WITH RAPID AVAILABILITY OF CRITICAL DATA AFTER CRITICAL EVENT

CROSS REFERENCE TO RELATED APPLICATIONS

The present application is related to the following U.S. patents and patent applications, which patents/applications are assigned to the owner of the present invention, and which patents/applications are incorporated by reference herein in their entirety:

U.S. patent application Ser. No. 10/727,462, entitled "METHOD FOR PROVIDING CRITICAL DATA IN AN HDD AFTER CRITICAL EVENT", filed on Dec. 4 2003, currently pending;

U.S. patent application Ser. No. 10/728,049, entitled "RAPID AVAILABILITY OF CRITICAL DATA THROUGH REALLOCATION", filed on Dec. 4, 2003, currently pending;

U.S. patent application Ser. No. 10/727,827, entitled "METHOD FOR RAPID AVAILABILITY OF CRITICAL DATA THROUGH REALLOCATION", filed on Dec. 4, 2003, currently pending;

U.S. patent application Ser. No. 10/727,773, entitled "HDD WITH STORAGE OF CRITICAL DATA IN FLASH", filed on Dec. 4, 2003, currently pending; and U.S. patent application Ser. No. 10/727,678, entitled "METHOD FOR STORING HDD CRITICAL DATA IN FLASH", filed on Dec. 4, 2003, currently pending.

FIELD OF THE INVENTION

The current invention relates generally to critical data management, and in some aspects FLASH memory system and cache memory system management.

BACKGROUND OF THE INVENTION

Computer devices with memory systems, such as desktop computers, laptop computers, notebook computers, PDAs, and other devices are becoming increasingly more common. As computer systems develop, thereby performing tasks faster and providing information more quickly, the desire to make their corresponding memory systems faster and more reliable increases as well.

Figure 1:
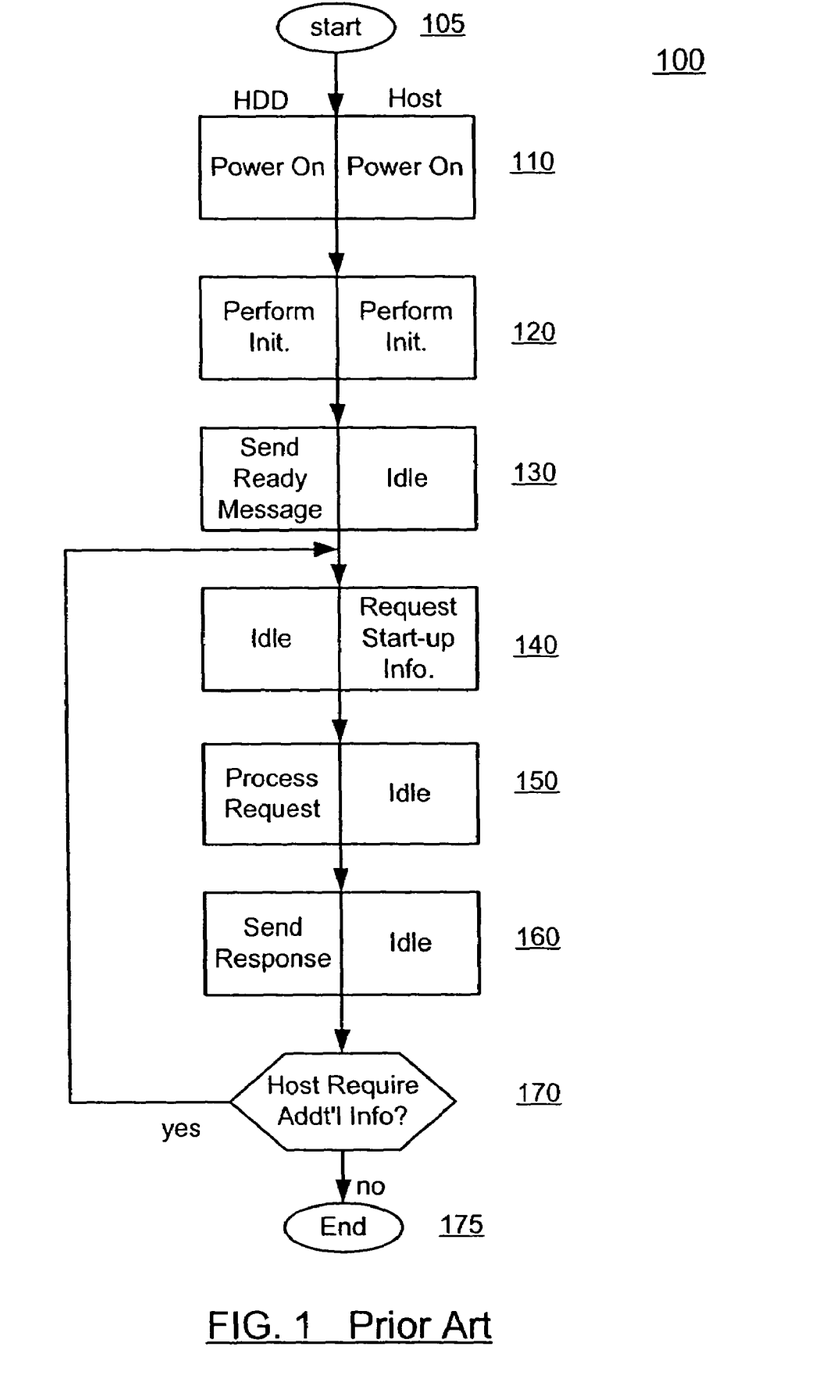
FIG. 1 is an illustration of a method for retrieving data from an HDD for a host device at power-on in accordance with the prior art.

FIG. 1 illustrates a method 100 for retrieving data from an hard drive device (HDD) for a host device at power-on in accordance with the prior art. Method 100 begins with start step 105. Next, power is provided to both the hard drive and host at step 110. After power-on, both the hard drive and the host undergo initialization procedures associated with start up 120.

At step 130, the hard drive informs the host device that the hard drive is in a ready state and available to receive commands. Upon receiving the hard drive ready signal, the host device may request data from the drive at step 140. Typically, the host device first requests a boot sector to determine initialization procedures and data locations on the drive media. The host drive may then determine the type of memory system the hard drive is configured as, such as a FAT system. Next, the host device may request the FAT system files. From the FAT system files, the host device may request data clusters associated with start-up and initialization data. For each request, the host sends a data request as illustrated in step 140. The hard drive processes the request at step 150. Processing the request may include spinning up the drive, loading the heads, seeking to the target track, reading the requested information, unloading the heads, and spinning down. The response is then sent from the hard drive to the host device in step 160. The hard drive determines if more requests are received or queued at step 170. If more requests are to be processed, operation of method 100 continues to step 140. If no further requests are to be immediately performed, operation of method 100 ends at step 175. Thus, for each request for data by the host device, the hard drive seeks to the location of the data, reads the data from the media into cache, and provides the data to the host device. The typical hard drive data access process as illustrated in FIG. 1 requires considerable amounts of time to retrieve data at power-on, thereby generating an undesirable delay between receiving a data request from the host device and providing the requested data to the host device.

Figure 2:
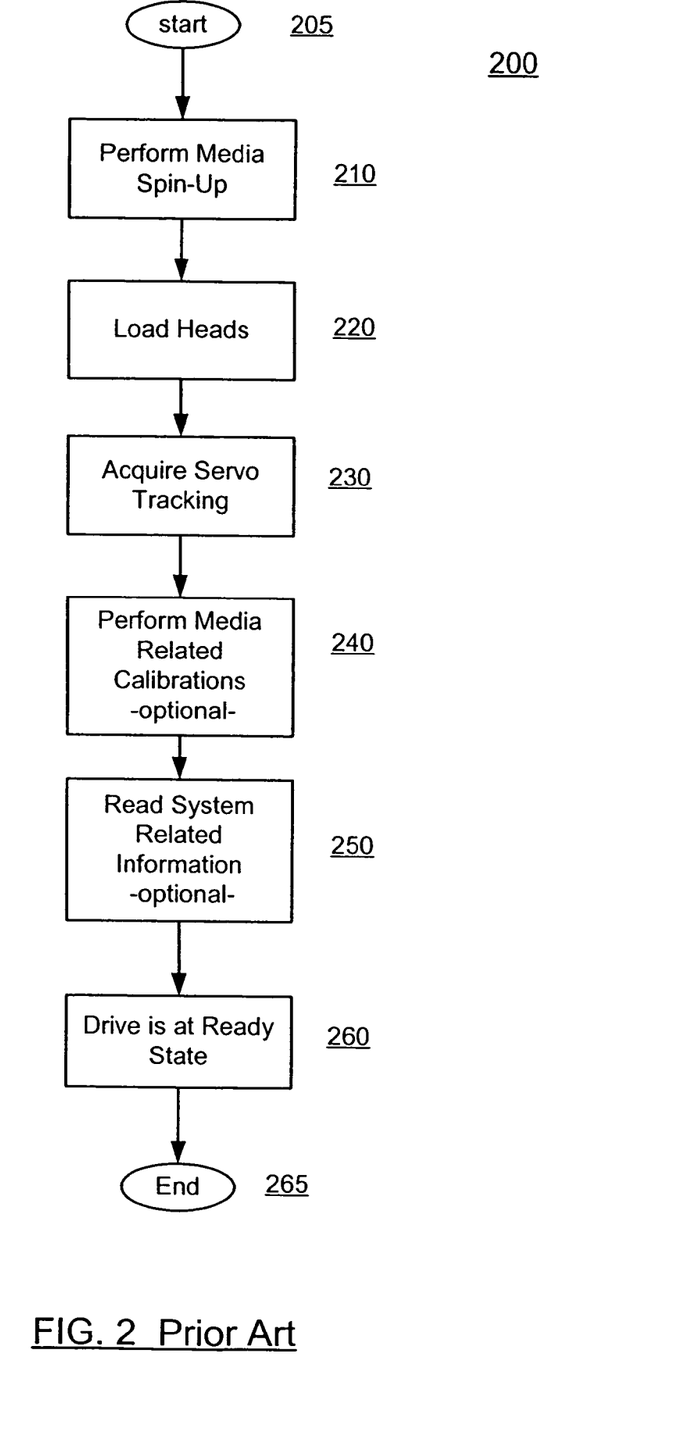
FIG. 2 is an illustration of a method for bringing a drive to a ready state in accordance with the prior art.

Retrieving information from a hard drive that is in a standby state also requires considerable time and power. FIG. 2 illustrates a method 200 for performing a data write to the hard drive media in accordance with the prior art. Method 200 begins with start step 205. Next, the hard drive media is brought to a spinning state at step 210. Once spinning, a hard drive will load the read/write heads at step 220 and then acquire servo tracking at step 230. Next, optionally, the hard drive may perform servo and/or media related calibrations at step 240 to ensure the drive is working properly. Then, system related data may be read at step 250. System related data may include system cylinder information or other information regarding the location address information of data. Since the hard drive may already have immediate access to the system related data from previous read operations, step 250 is optional. The final system read may include reading data from one or more of the system cylinders. Once the final system read is performed, the drive is ready to perform a user data read or write operation at step 260. Operation of method 200 then ends at step 265. As illustrated in the prior art method of FIG. 2, the standard data access method while a hard drive is in an idle state consumes valuable power and time. This can be particularly costly in power sensitive devices, or in situations where power or time is to be conserved.

What is needed is a hard drive that operates using better data accessing methods for overcoming the disadvantages of the prior art.

SUMMARY OF THE INVENTION

In one embodiment, a hard drive of the present invention retrieves critical data that it determines is very likely to be requested by a host device in the near future and stores it in cache memory. The hard drive provides the critical data to the requesting host upon receiving the request, thereby eliminating the time required to respond to the request due to media accessing. In one embodiment, the critical data is retrieved upon the occurrence of a critical event. The critical event may be an event such as the power-on of a host or computer in communication with the HDD. The critical data may be related to power-on of the host or computer, such as boot sector FAT system data. Thus, in contrast to typical caching systems, the cache of the present invention may contain data that was not requested since the last time that the computer was started, as opposed to the most recently-requested data.

DETAILED DESCRIPTION

The present invention is a system for providing critical data from a HDD to a host device in a rapid and more efficient manner. In one embodiment, the critical data is data associated with start-up and initialization of the host device and HDD. The start-up and initialization data may include FAT system data, boot sector data, and other data. In other embodiments, the critical data is data for which the host device's need for the data can be predicted through different signals received, host device requests, or the occurrence of some other event.

Figure 3:
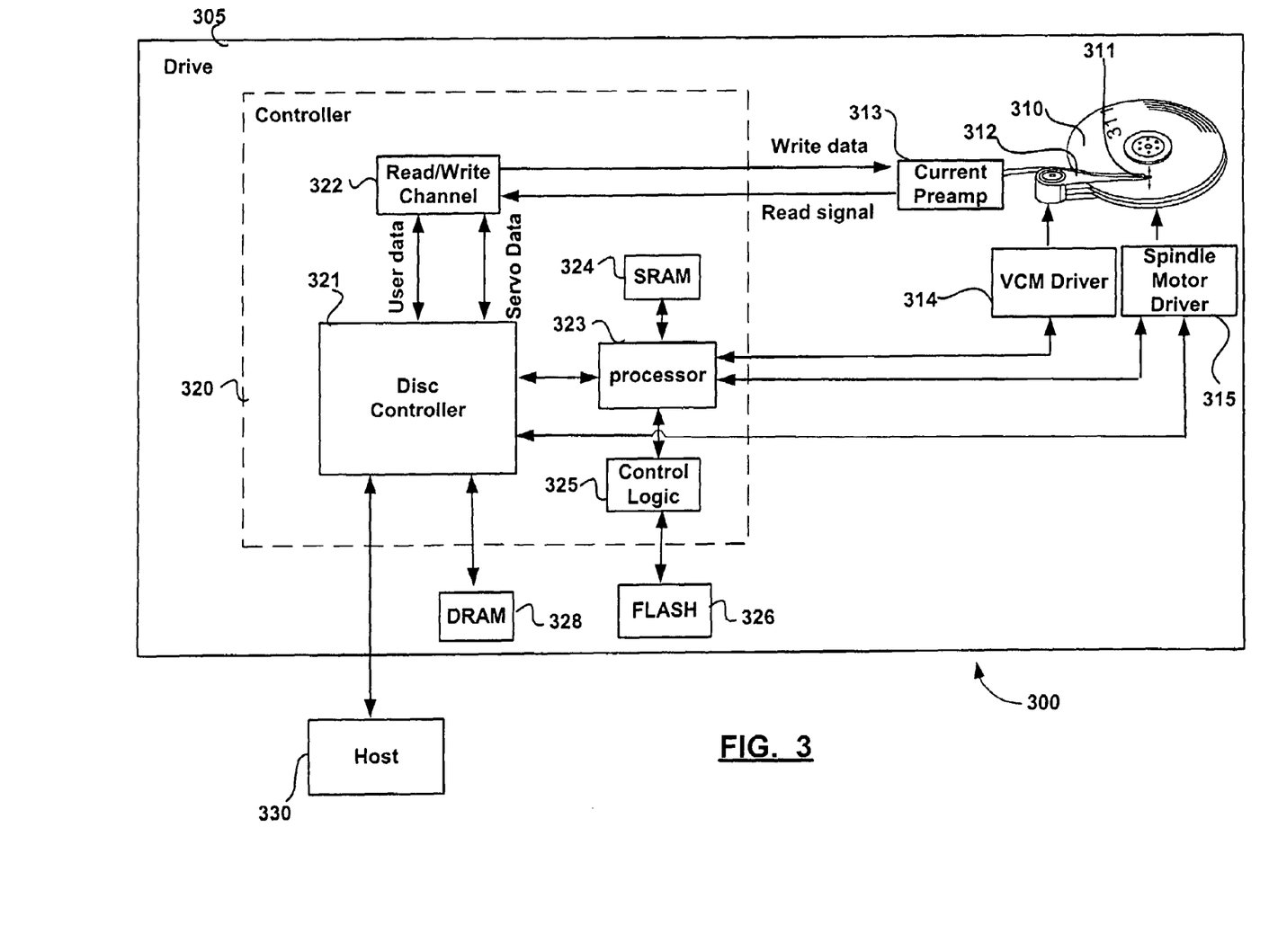
FIG. 3 is an illustration of a hard drive system having internal FLASH in accordance with one embodiment of the present invention.

FIG. 3 illustrates an HDD system 300 in accordance with one embodiment of the present invention. HDD system 300 includes drive 305, which is comprised of controller circuitry 320, media 310, write and read heads 311, actuator 312, current preamp 313, VCM driver 314, spindle motor Driver 315, DRAM 328, and FLASH 326. Controller circuitry 320 includes disk controller 321, read/write channel 322, processor 323, SRAM 324 connected to processor 323, and control logic 325 connected to processor 323 and FLASH 326. A host device 330 is connectively coupled to drive 305. In operation, the disk controller 321 reads and writes to DRAM 328. The processor 323 handles access to FLASH 326 as well as initiating access to media 310 through the disk controller 321, Read/Write Channel 322, Preamp 313, and write and read heads 311.

Rapid Availability of Critical Data

Figure 4:
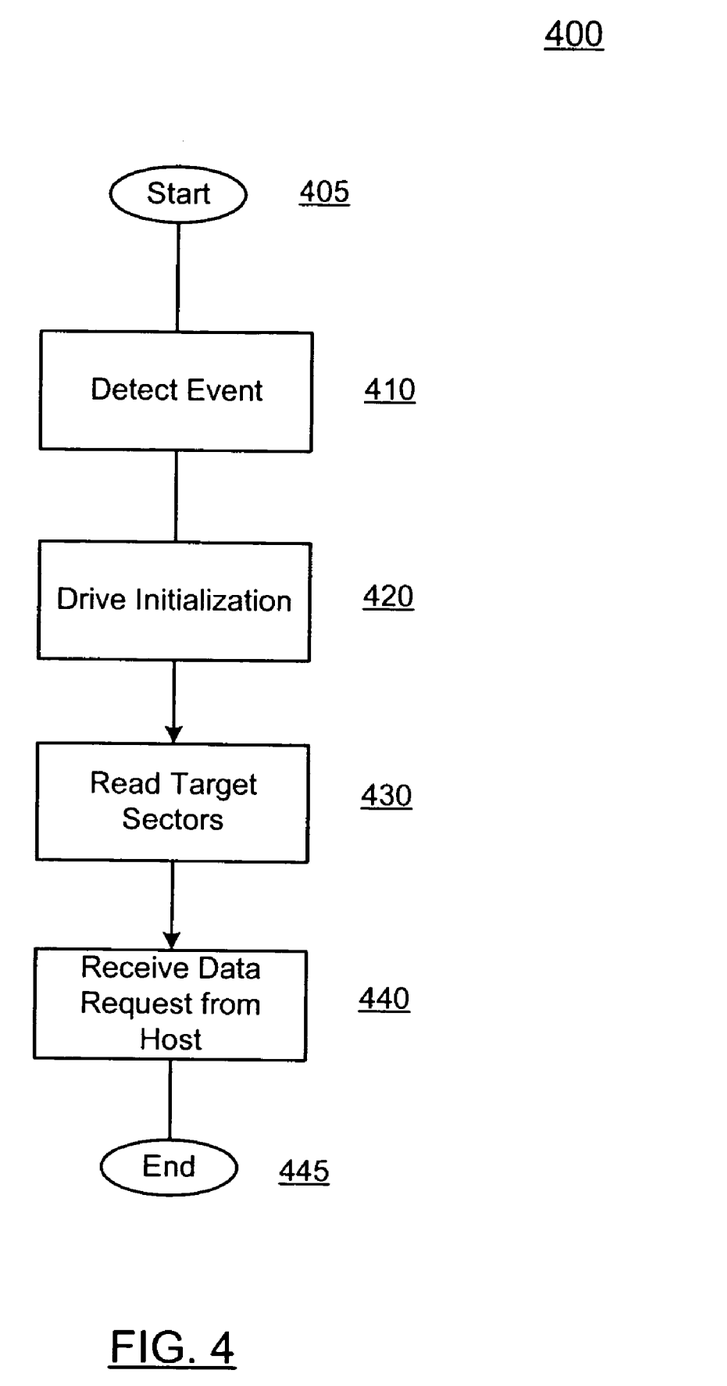
FIG. 4 is an illustration of a method for retrieving data from an HDD for a host device at power-on in accordance with one embodiment of the present invention.

FIG. 4 illustrates a method 400 for retrieving data at the detection of a critical event by a hard drive. In one embodiment, the critical event is the power-on or resumption of operation after "hibernation" mode of the hard drive and host device. Though method 400 will be discussed with reference to the detection of power-on as the critical event, similar data access methods may be used for other detected events as well. Method 400 begins with start step 405. Next, a critical event is detected at step 410. The critical event indicates that the host device is likely to request critical data in the near future. In one embodiment, the critical event is the detection of hard drive power-on. Next, hard drive initialization is performed at step 420. Hard drive initialization may include spinning up the hard drive media, loading the heads, and other typical tasks performed at hard drive boot-up. In one embodiment, the hard drive is initialized when it is able to seek to tracks and read data. Optionally, if the hard drive is ready to perform a seek when the critical event is detected, fewer or no initialization steps may be performed at step 420.

Once the hard drive is initialized, it proceeds to read critical data from target sectors at step 430. The target sectors are sectors determined to have data that is very likely to be requested by a host device based on the critical event. In an embodiment where the host computer is booting up, the target sectors may include a boot sector, FAT data or information, and other data needed by the host device upon start-up. The target sectors may be loaded into cache memory located within the drive at step 430. Next, the hard drive receives a request for critical data at step 440. If the critical data requested at step 440 matches the critical data retrieved at step 430, the retrieved critical data is sent to the host device in response to the host device request. Operation of method 400 then ends at step 445. Since the drive may have to determine the location of the critical data before it has spun up the disks and loaded the heads, it may be necessary to store information about the location of the critical data in the drive's FLASH 326.

At step 430, the hard drive reads critical data from a target sector. The hard drive may determine what the critical data is and target sectors it is located at in numerous ways. In any case, the drive will exhibit faster performance by providing previously retrieved critical data to the host device without spending time to retrieve the critical data from the media after such data is requested by the host 330. Even if the drive has not yet finished retrieving the critical data at the time that the host requests it, having already started the data-retrieval operation in advance of receiving a request for the data will shorten the time between the request and delivery of the data.

In one embodiment, the target sectors are determined to be the same sectors called after a similar previous critical event was detected. For instance, in the case of hard drive power-on, the target sectors read at step 430 may be the same target sectors read for the previous power-on of the hard drive and host device. In another embodiment, the target sector may be determined to be the most often requested sectors after a number of previous critical events were detected. The number may be any number, such as the last ten, twenty, or hundred events. The number may also be a running total of events. In this embodiment, the hard drive may get "smarter" with each boot-up, and be more likely to provide the correct critical data requested by the host device at power-on after the requested data from past power-ons is compared.

In another embodiment, the target sector may be a sector designated by a user of the hard drive, manufacturer of the host device, or some other party. Thus, in one embodiment, the hard drive could be configured to receive vendor unique commands to the hard drive indicating what target sectors should be read to prepare for an upcoming request.

The concept of determining what critical data and target sectors to store and retrieve are in contrast to methods performed by the prior art. In particular, the present invention stores and caches data that has typically not been accessed recently. Unlike the present invention, most cache systems save the most recently used or requested data on the assumption that what was most recently written or read is more likely to be accessed again. Thus, in the present invention, and most particularly with regards to managing critical data for the next power-up event, the data requested is often not only not the most recently requested, but data that would be deleted by most other cache systems over time.

Target Sector Reallocation

Typical target sector reallocation techniques of the prior art address replacing defective sectors. U.S. Pat. No. 5,235,585, entitled "Reassigning defective sectors on a disk", and U.S. Pat. No. 6,189,110, entitled "Disk device and data reassignment method", hereby incorporated by reference in its entirety, each disclose a means for replacing a defective sector with a spare sector. In one embodiment of the present invention, critical data zones or sectors of data may be reallocated in sequential order. For example, the target sectors determined to contain critical data requested in step 430 may be reallocated to exist in sequential order on the disk, even though the Logical Block Addresses (sometimes referred to as LBAs) retain their original assigned values. When placed in sequential order, the data can be retrieved quicker in subsequent read operations.

In one embodiment, the sequential order could be determined by a log containing information regarding past requests received by the hard drive for critical data. Based on the log contents, the hard drive may re-allocate critical data sectors to sequential sectors in the general order the log indicates they were retrieved. The sequential order could be determined in several ways, including the order the critical data sectors were last read from or the order the critical data sectors have been read most frequently. One way to allow re-allocation of the critical data sectors to permit sequential access is to place those re-allocated sectors in a reserved area of the drive. Devoting a region of contiguous sectors to such re-allocated data may require use of data-storage area that could otherwise be used to increase the capacity of the drive. It is likely, however, that the benefits of faster access to critical data will far outweigh the disadvantage of a slightly reduced drive capacity.

In accordance with the present invention, the critical data sectors can be reallocated to reserved areas that further enhance the speed and reliability of critical data access operations. In one embodiment, the critical data can be reallocated to reserved tracks having an RRO that is smaller than the typically accepted RRO. The smaller than typically accepted RRO could be achieved though more careful servowriting or extensive use of RRO-reduction techniques on final wedges, which processes are generally known in the art. Methods for using RRO-reduction technologies during a self-servowriting process are disclosed in U.S. Pat. No. 6,631,046, entitled "Servo track writing using extended copying with head offset", hereby incorporated by reference in its entirety. Methods for using RRO-reduction technologies in general (either during a self-servowriting process, or after servowriting, to reduce the RRO of the servowritten wedge pattern) are disclosed in U.S. Pat. No. 6,069,764, entitled "Compensation for repeatable run-out error", hereby incorporated by reference in its entirety. As would be apparent to one of ordinary skill in the art, the techniques disclosed in these patents can provide reduced RRO at the cost of longer processing-time during the drive manufacturing process. Methods for enhancing the speed and reliability of critical data access operations are also disclosed in U.S. patents entitled "Methods for Self-Servowriting with Multiple Passes per Servowriting Step", patent application Ser. No. 10/420,127, "Methods for Self-Servowriting Using Write-Current Variation", patent application Ser. No. 10/420,498, "Methods for Selective Multi-Pass Servowriting and Self Servowriting", patent application Ser. No. 10/622,215, "Methods for Variable Multi-Pass Servowriting and Self Servowriting", patent application Ser. No. 10/630,522, "Methods Using Extended Servo Patterns with Multi-Pass Servowriting and Self Servowriting", patent application Ser. No. 10/630,528, and "Methods Using Extended Servo Patterns with Variable Multi-Pass Servowriting and Self Servowriting", patent application Ser. No. 10/630,524, all of which are hereby incorporated by reference in their entirety.

In another embodiment, the critical data can be written to tracks having a higher than normal inter-track spacing. For example, the tracks surrounding the track containing the critical data can be erased, kept isolated, or the track spacing between the critical data track and surrounding tracks can be increased. The use of isolated tracks can enhance the speed of reading by allowing very rapid seeks to the target tracks, with relatively loose settle-criteria, because there would not be much signal interference from adjacent data-tracks. Maintaining critical data on every other track, for example, allows for easier writing and off-track reading of the critical data. However, the portion of the disk for which only every other track is utilized will be reduced to one half of its potential capacity. In one embodiment of the present invention, the hard drive can be configured through programming to utilize a customized quantity of the hard drive media for isolated critical data storage. Thus, a host device could indicate how much space should be reserved for storing critical data on isolated tracks.

In yet another embodiment, the critical data could be written to a track in a slower than typical manner. Typically, hard drives write data to data tracks as fast as possible while still maintaining some minimum servo accuracy threshold. Thus, slower than typical data track writing means writing at a speed that is less than the optimal writing speed for the head and media combination. Slower track writing reduces the mis-placement of the written data to within a smaller range than that normally considered acceptable. As a result, the data may be read easier at faster speeds. For example, the drive could seek to the target tracks on which the data is to be written using more conservative settle-limits, so that the resulting post-seek TMR (Track Mis-Registration) is more nearly equal to the steady-state on track TMR. In another embodiment, a combination of small RRO tracks, isolated tracks, and slow track writing can be used to maintain a higher tracking quality during the writing of critical data.

Using FLASH as Cache

In one embodiment of the present invention, critical data can be stored in FLASH memory. Storing critical data in FLASH may reduce the power and time required for read and write operations, especially for critical data that is read much more often than it is written. The type of critical data that a hard drive may determine should be written to FLASH may be the same type of critical data discussed in reference to step 430 of method 400. In one embodiment, critical data may be compressed to allow for increased storage in the FLASH. Many methods for compressing data are known in the art, of which any could be used in the present invention. When maintaining critical data in hard drive FLASH, the critical data is maintained as normal cache memory in a hard drive. Thus, as data is changed, updates must be made to both the actual copies of the data and the cached versions of the data throughout the drive, or the cache-entry must be invalidated The critical data stored can be a small quantity of up to 500 kilobytes or larger significant amounts of several megabytes, depending on the available FLASH space. The critical data may be stored in any extra space of typical hard drive FLASH. This extra space would be within the same FLASH that the hard drive stores its code and data. In another embodiment, the critical data can be stored in an additional second FLASH integrated circuit or chip. The additional FLASH IC may be placed in the PCB of hard drives. In one embodiment, when a plurality of FLASH ICs are used within a single HDD, two or more of the FLASH ICs may share common data and clock signals have separate enable signals. In another embodiment, a combination of both typical and additional FLASH could be used to store critical data. If an additional FLASH ICs is added to a drive to enhance its availability of critical data, it can be designed into the PCB of all drives of a given design, but only loaded onto some PCBs. The drive firmware would sense the presence or absence of the additional FLASH ICs and make use of it if it is found. This would create essentially two classes of drives. Both would have the same basic functionality, but the one containing the extra FLASH ICs would perform better in some circumstances, at some additional parts cost.

Low Power Storage of DRAM Data to FLASH

Hard drive FLASH can also be used to store data from DRAM cache memory or other memory sources on the hard drive. As discussed above, saving data to FLASH may consume less energy than writing data to the drive media. The higher energy consumption for media writes is due to the required spinning up of the media, loading of the heads calibrations, writing the data and then unloading the heads.

Thus, writing data to FLASH rather than to a hard drive media may be useful when the drive is in low power idle state (the media is not spinning) and it is desirable to maintain the low power state. Additionally, the write to FLASH may be advantageous when the drive is transitioning from an on state to a low power state or off state.

For example, the hard drive may be in a low power state with data in the DRAM cache. At the occurrence of some event, the hard drive may determine that the DRAM cache should be shut off. Rather than spending energy to write the data to the hard drive media, the drive may write the contents of the DRAM cache to FLASH. Generally, several hundred kilobytes can be written to FLASH in the time it takes to spin up a typical hard drive media.

In another example, when a hard drive determines that the host device is about to power down, the hard drive may quickly write the contents of a DRAM cache to FLASH within the hard drive. In this case, the drive can be configured to log the write to FLASH before power-down. Upon subsequent power-up, the hard drive may be configured to check the log to determine if any writes were made to FLASH at last power-down, retrieve any FLASH data written, and load the data into the DRAM cache. As discussed above regarding using FLASH as cache memory, data written to FLASH from DRAM cache may be compressed to allow for increased storage capability.

In one embodiment, a hard drive of the present invention retrieves critical data that it determines will be requested by a host device in the near future and stores it in cache. The hard drive provides the critical data to the requesting host upon receiving the request or shortly thereafter, thereby eliminating or greatly reducing the time required to respond to the request due to media accessing. The critical data may be related to power-on of the computer, such as boot sector FAT system data. In this embodiment, the cache of the present invention may use old data rather than new data or the last data accessed. The critical data can be written to reserved areas of the media that provide desirable read characteristics. In this aspect, the present invention may trade drive capacity and media write speed for media read speed. In another embodiment of the present invention, critical data is re-allocated and placed in sequential order. In another embodiment, critical data may stored in FLASH memory. The critical data may be accessed quicker and while consuming less energy. During lower power periods, other data can be written to FLASH in order to conserve energy.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention may include a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention may include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, providing a hard drive that provides rapid availability of critical data.

The invention claimed is:

1. A system for providing critical data in a hard drive, comprising:
    a rotatable medium capable of storing information written to the rotatable medium;
    a read element capable of reading information from the rotatable medium; and
    a control mechanism adapted to receive data from and transmit data to a host device, control the rotatable medium, and position the read element over the rotatable medium, the control mechanism configured to:
        receive a signal indicating an event has occurred;
        associate the event with a portion of information written to the rotatable medium;
        read the portion of the information from the rotatable medium with the read element; store the portion of the information in one of volatile and non-volatile solid state memory;

receive an information request signal from the host device;

determine whether the portion of the information matches the information request; and provide the portion of information to the host device.

2. The system of 1 wherein the event is host boot-up.

3. The system of 2 wherein read the portion of the information includes:

read information associated with hard drive boot-up.

4. The system of 1 wherein read the portion of the information includes:

access location information from a FLASH;

read the portion of the information, the location of the portion of the information written to the rotatable medium derived from the location information.

5. The system of 1 further comprising:

a processor configured to associate the event with a portion of information written to the rotatable medium.

6. The system of 5, wherein identify the critical data includes:

record information requests associated with past occurrences of the event; and identify the portion of information written to the rotatable medium based on the information requests.

7. The system of 6 wherein identify the portion of information written to the rotatable medium based on the recorded information requests includes:

identify the portion of information written to the rotatable medium to be information requested in the most recent recorded information request.

8. The system of 6 wherein identify the portion of information written to the rotatable medium based on the recorded information requests includes:

identify the portion of information written to the rotatable medium to be information most often requested in the recorded information requests.

9. The system of 5, wherein identify the portion of information written to the rotatable medium further includes:

receive a vendor unique command from the host device; and identify the portion of information written to the rotatable medium to be information specified in the vendor unique command.

* * * * *

UNITED STATES PATENT AND TRADEMARK OFFICE
CERTIFICATE OF CORRECTION

PATENT NO. : 7,174,421 B2 Page 1 of 1
APPLICATION NO. : 10/727721
DATED : February 6, 2007
INVENTOR(S) : Richard M. Ehrlich It is certified that error appears in the above-identified patent and that said Letters Patent is hereby corrected as shown below:

Column 9, line 24:

After "based on the", insert --recorded--.

Signed and Sealed this

Twenty-ninth Day of May, 2007

JON W. DUDAS
*Director of the United States Patent and Trademark Office*